United States Patent [19]

Duchesne et al.

[11] 4,336,673

[45] Jun. 29, 1982

[54] MOSAIC DISPLAY PANEL

[75] Inventors: Gaston Duchesne, Quebec; Marc Laflamme, Bellechasse; Denis Matte, Ste-Foy, all of Canada

[73] Assignee: Monitronik Ltee., Quebec, Canada

[21] Appl. No.: 184,621

[22] Filed: Sep. 5, 1980

[51] Int. Cl.³ .................. E04F 19/00; G12B 9/08; E04F 13/00

[52] U.S. Cl. ........................... 52/27; 211/189; 248/27.1; 52/385

[58] Field of Search .............. 52/27, 384, 385, 386, 52/36; 211/187, 188, 189, 190, 194; 248/27.1, 220.2, 216.4, 221.1

[56] References Cited

U.S. PATENT DOCUMENTS 4,192,562  3/1980  Bishoff ........................... 211/189
4,199,070  4/1980  Magnussen ..................... 211/194

FOREIGN PATENT DOCUMENTS 93972  of 1948  France ........................... 211/187

Primary Examiner—John E. Murtagh
Assistant Examiner—Eugene R. Washington
Attorney, Agent, or Firm—Cushman, Darby & Cushman

[57] ABSTRACT

A mosaic display panel is formed of a series of interconnected horizontal and vertical supports and of a mosaic of tiles and control instruments; a cluster of interfittingly connected elements is provided for mounting the tiles and instruments to the vertical supports; each side wall of each mounting element has a longitudinal projecting tab and a longitudinal guideway, both of substantially complementary shape, so that the tab and guideway of one side wall of this mounting element may be respectively engaged with the guideway and the tab of the side wall of an adjacent mounting element whereby a cluster of such mounting elements may be formed and mounted to two adjacent vertical supports.

8 Claims, 5 Drawing Figures

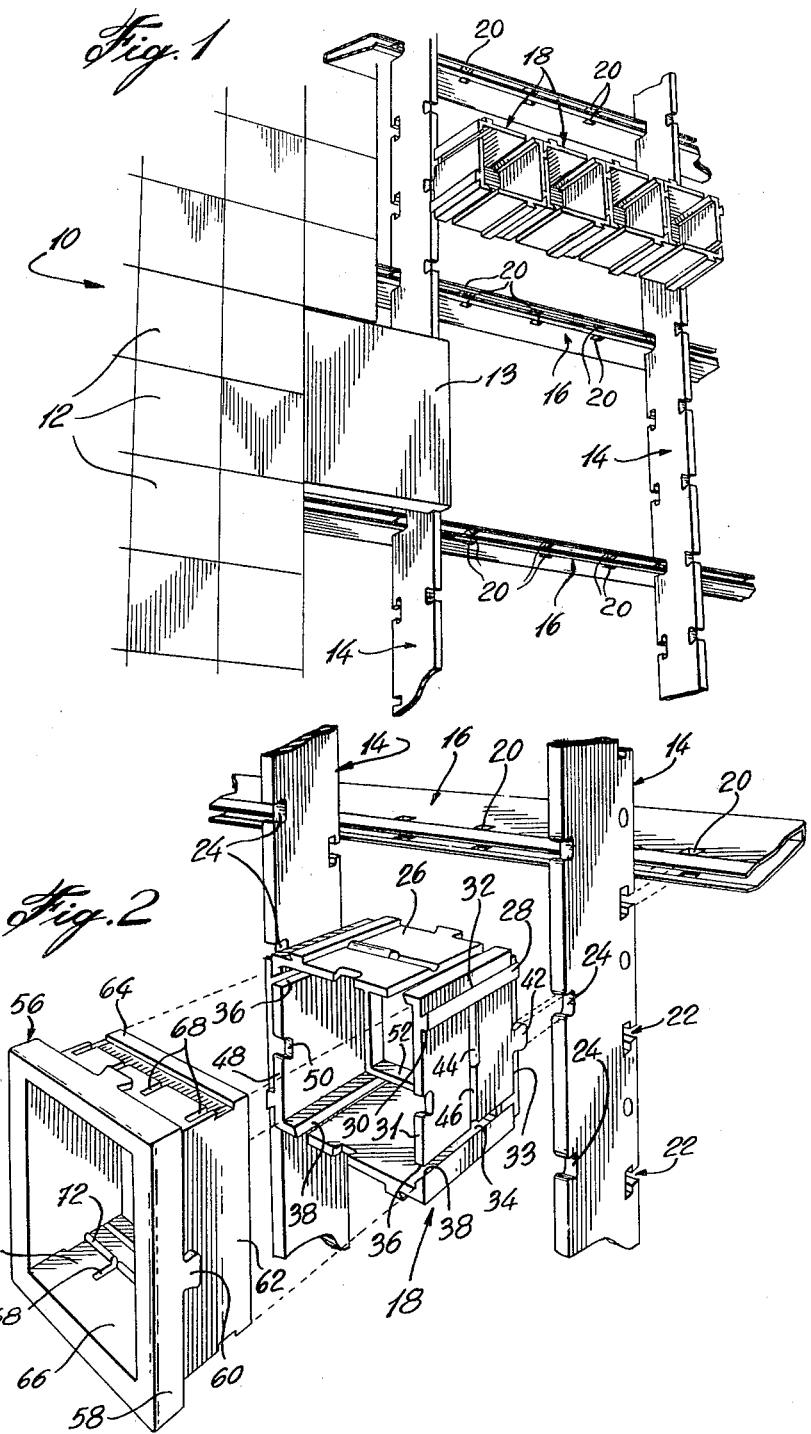

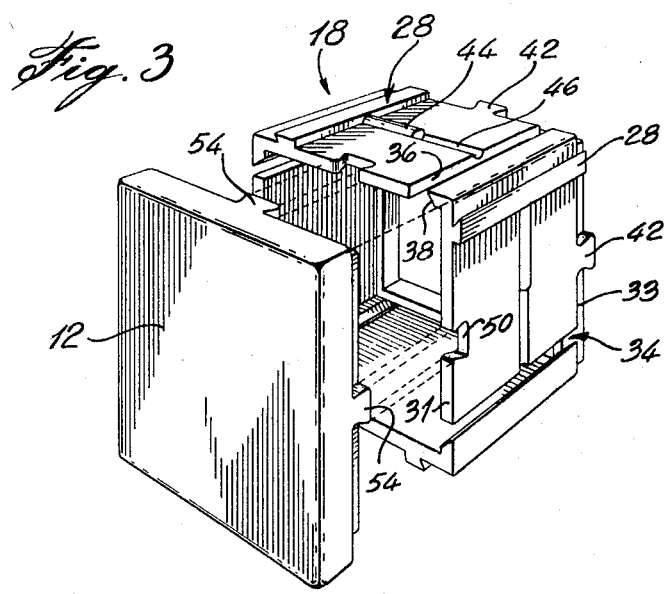
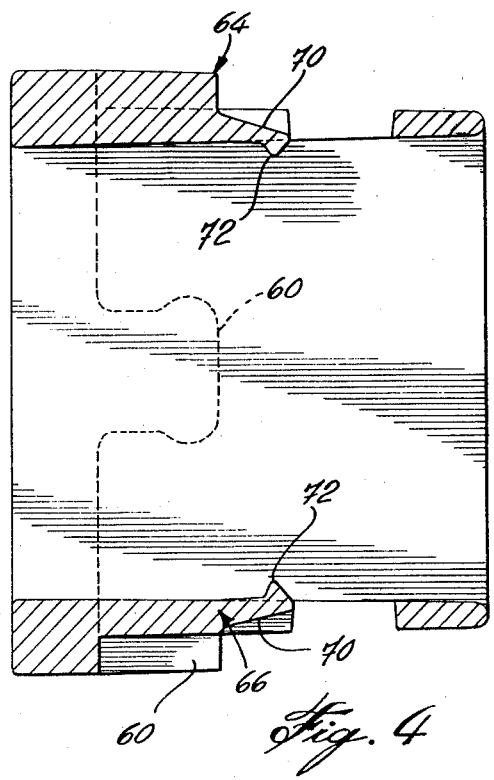

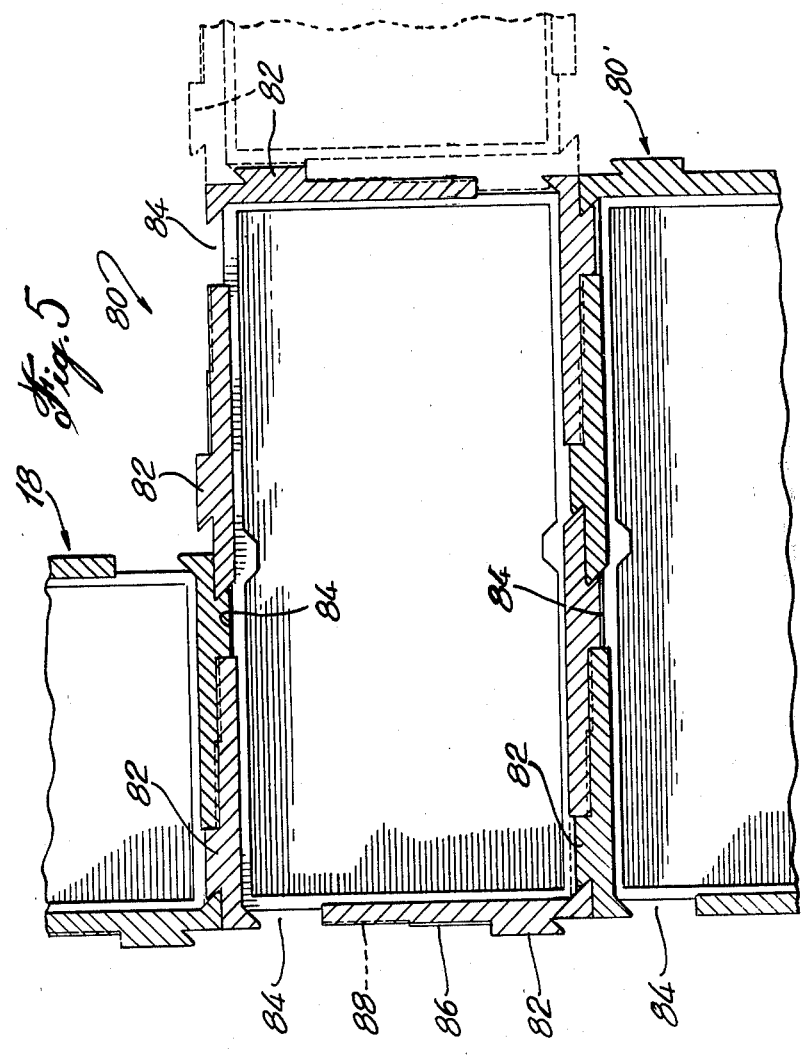

MOSAIC DISPLAY PANEL

FIELD OF THE INVENTION

The present invention pertains generally to mosaic display panels such as used, for example, as control panels in power processing and engineering industries.

BACKGROUND OF THE INVENTION

Control panel systems consist of horizontal and vertical mounting supports and of spring clamps from which is built a grid-like supporting frame. From the front of this frame, is mounted a mosaic of tiles and control instruments, such as switches, pilot lamps, indicators or like instruments.

At present, the vertical supports are spaced from one another a distance corresponding to the width of a tile or of a control instrument. Hence, each tile and each control instrument are mounted successively to two vertical supports. This is a time-consuming operation especially in cases where a great number of blank tiles (i.e. tiles which do not carry any information on the front face thereof) is required for an important area of the display panel. Also, the mounting procedure is a costly operation since there are as many vertical supports as there are vertical lines of tiles in the grid.

OBJECTS AND STATEMENTS OF THE INVENTION

It is an object of the present invention to provide a mosaic display panel where the number of vertical supports is greatly reduced and also the assembly of a major part of the panel can be effected prior to be installed on the vertical supports. This is achieved by providing an intermediary mounting element between the vertical support and the tile or control instrument. Hence, a cluster of mounting elements can be interfittingly connected to form a tile or instrument supporting section of the panel which can then be mounted to two adjacent vertical supports.

The present invention therefore relates to a mounting element adapted to a mosaic display panel which is formed of vertical and horizontal supports and of mosaic tiles and control instruments; each mounting element is formed of side walls each including front, rear and side edges; the rear edge has means engageable with the vertical supports while the front edge has means engageable with tiles and control instruments; each side wall has an outer face displaying thereon a longitudinal projecting tab distanced from one of the side edges and a longitudinal guideway distanced from the other side edge; the tab and the guideway are substantially complementary in shape so that the tab and guideway of said side wall may be respectively inter-connected with the guideway and the tab of the side wall of an adjacently disposed mounting element whereby a cluster of mounting elements may be formed and mounted to two adjacent vertical supports.

In an another form of the invention, the side walls further include means to prevent relative movement between the mounting elements once assembled.

The invention is also concerned with a component which allows mounting a control instrument to a mounting element.

Other objects, purposes and characteristic features of the present invention will be in part obvious from the accompanying drawings and in part pointed out as the description of the invention progresses. In describing the invention in detail, reference will be made to the accompanying drawings in which like reference characters designate corresponding parts throughout the several views. It should be understood, however, that this detailed description, while indicating preferred embodiments of the invention is given by way of illustration only since various changes and modifications within the spirit and scope of the invention will become apparent to those skilled in the art.

IN THE DRAWINGS

FIG. 1 is a perspective view showing part of a control panel made in accordance with the present invention;

FIG. 2 is an exploded view showing the mounting element of the present invention together with the component adapted to mount a control instrument to the mounting element;

FIG. 3 is a perspective exploded view showing a mounting element and a tile;

FIG. 4 is a cross-sectional elevational view of the component shown in FIG. 2; and FIG. 5 shows another embodiment of a mounting element made in accordance with the present invention.

DESCRIPTION OF PREFERRED EMBODIMENT

Referring to FIG. 1, there is shown the components making up part of a control panel such as used for instance in a power processing company. Such panel consists of a front face 10 formed of a series of tiles of various sizes 12 and 13 which when assembled together hide and are supported by a grid like structure formed of a series of vertical supports 14 and horizontal supports 16. These tiles are made of a rigid plastic material and may be blank or displaying information data, such as lines, signs or other symbols. The supports 14 and 16 are usually mounted within a frame (not shown) or cubicle which may be fixedly attached to other frames or cubicles to form a large display area, such as found in power plant control rooms.

Although not shown in the drawings, a control instrument may be mounted to the panel in place of a tile as described hereinbelow.

An important feature of the present invention is that it is not necessary to have as many vertical supports as there are vertical rows of tiles. Indeed, as seen in FIG. 1, the vertical supports are longitudinally spaced from one another a distance corresponding to substantially four times the width of a tile 12. This feature is achieved in the present invention by providing between the vertical supports and the tiles or control instruments a mounting element 18, four of which are shown in FIG. 1 between two successive vertical supports 14.

The horizontal supports 16 serve to maintain the vertical supports in place; they include a plurality of square-shape openings longitudinally spaced along the front edge thereof at a small distance therefrom. The vertical supports 14 have along the rear edge thereof a plurality of vertically spaced T-shaped slots 22 which are so dimensioned as to be engaged openings 20 of the horizontal supports. The front edge of each vertical support displays a series of vertically shape recesses 24, the function of which will be described hereinbelow.

Each mounting element 18 consists of a rectangular hollow block having four identically shaped side walls 26. The outer face of each side wall displays a longitudinal projecting tab 28, dove-tail shaped with a flat edge 30 and an inclined edge 32, the tab extending from the front edge 31 of the side wall to the rear edge 33 thereof at a small distance from the contiguous side wall. Each side wall also displays a rectangular guideway 34 which is defined by a flat edge 36 and an inclined edge 38, the opening extending also from the front edge 31 of the side wall to the rear edge 33 thereof at a small distance from the other contiguous side wall. The rear edge 33 of the side wall displays a small tab 42 having a shape corresponding to the shape of the recess 24 in the front edge of the vertical support so that the tab may tightly engage the vertical support, with the remaining portion of the rear edge abutting the front edge of the vertical support. The outer face of the side wall also includes, betwen tab 28 and guideway 34, a boss 44 of semi-circular shape and a recess 46 also semi-circular shaped and corresponding in length to that of the boss. The front edge 31 includes a recess 50 having a shape corresponding to the shape of the rear tab 42. The mounting element 18 is made of an injection molded plastic material, all four side walls being integrally mounted to another as a result of the rear inner peripheral portion 52 joining all side walls.

Referring to FIG. 1, the mounting elements 18 may be interfittingly connected by having the dove-tail tab 28 and guideway 34 of the side wall of one element slidably inserted into the similarly shaped tab and guideway of the side wall of an adjacent mounting element. To prevent any lateral movement between connected elements 18, the boss 44 of one mounted element is engagedly received in the recess 46 of the adjacent connected element 18.

Once inter-connected, elements 18 can receive a tile or a control instrument. In the case of a tile, the rear edge of each side wall includes a tab 54 which has a shape corresponding to the shape of recess 50 on the front edge 31 of the mounting element so that the tile may be tightly engaged to the connecting element. In the case where a control instrument is to be mounted to the control panel, an instrument component 56 (see FIGS. 2 and 4) is used. Component 56 consists of a rectangular hollow body with a front peripheral frame portion 58, the rear edge of each side wall of which comprises a tab 60 of similar construction to that of tab 54 of tile 12 and to that of recess 50 on the front edge 31 of each side wall. The component 56 also includes a rearwardly extending body portion 62 of rectangular shape, which is so dimensioned as to be tightly engaged within the hollow body of the mounting element 18. One characteristic of this component 56 is that the upper and lower walls 64, 66 include a series of small slits 68 which define a plurality of resilient tongues 70, each having an inwardly projecting portion 72 which serves to apply pressure against the body of a control instrument when inserted into this component. The projecting portions 72 pivot outwardly as the instrument is inserted; however, the resiliency in the material used (preferably plastic) for this component allows such pressure on the top and lower side of the instrument.

Referring to FIG. 5, there is shown a variant of a mounting element 80 of larger size than the above described mounting element 18 and which is shown connected to such mounting element 18 and to a similarly shaped connecting element 80'. Element 80 has a width twice that of element 18 and may be used for instance where an instrument of larger size than that referred to above is to be mounted to the panel. The two shortest walls have a construction similar to that of the side walls of mounting element 18 described above and will therefore not be repeated here. The other two sides walls of larger width include two tabs 82 and two guideways 84 and, between these tabs and guideways, bosses and recesses, such as shown as 86 and 88 on the left-hand side of the mounting element of FIG. 5, are provided with an identical arrangement to those provided on mounting element 18 above. Of course, the instrument component adapted to be used with this mounting element 80 will have a shape to be fittingly engaged within said element.

Although not described, it is evident that mounting elements of a size which is a multiple of the mounting element 18 may also be made for even larger instruments which may be mounted to a panel.

The embodiments of the invention in which an exclusive property or privilege is claimed are defined as follows:

1. In a mosaic display panel formed of horizontal and vertical supports and of a mosaic of tiles and control instruments, a cluster of interfittingly connected elements for mounting said tiles and control instruments to said vertical supports; each mounting element being formed of side walls, each side wall including front, rear and side edges; said rear edge having means engageable with said vertical supports; said front edge having means engageable with said tiles or said control instruments; each said side wall having an outer face displaying thereon a longitudinal projecting tab distanced from one of said side edges of said side wall and a longitudinal guideway distanced from the other of said side edges; said tab and said guideway being substantially complementary in shape so that the tab and guideway of said side wall may be respectively inter-connected with the guideway and tab of the side wall of an adjacently disposed mounting element whereby said cluster of mounting elements may be formed and mounted to two adjacent vertical supports.

2. In a mosaic display panel as defined in claim 1, wherein said outer face of said side wall further includes, between said tab and guideway, aligned boss and recess means complementary in shape so as to engage correspondingly shaped recess and boss means on the outer face of an abutting mounting element to prevent relative movement of said mounting elements in said cluster.

3. In a mosaic display panel as defined in claim 1, wherein said mounting element is a unitary hollow rectangular moulded block.

4. In a mosaic display panel as defined in claim 1, wherein said front edge of each said side wall includes a recess for engagedly received a tab on said tiles or control instruments.

5. In a mosaic display panel as defined in claim 1, wherein said rear edge of each said side wall includes a tab adapted to be engagedly received in a recess provided in said vertical supports.

6. In a mosiac display panel as defined in claim 1, wherein each said control instrument includes a component adapted to be tightly fitted to said mounting element; said component having a hollow rectangular shape with a front peripheral portion provided with means adapted to engage the front edges of said connecting element and a rearwardly extending body portion engageable within said mounting element; said body portion including resilient means in at least one side wall to apply pressure against a control instrument body once inserted in said body portion.

7. In a mosaic display panel as defined in claim 6 wherein said resilient means consist of a series of tongues extending in said side wall of said body portion, said tongues having a protruding edge projecting inwardly of said body portion to contact said control instrument body.

8. In a display panel as defined in claim 1, said horizontal supports having means thereon to be engaged by cooperating engaging means on the rear edge of said vertical supports.

* * * * *